United States Patent
Iotti

(10) Patent No.: US 7,262,578 B2
(45) Date of Patent: Aug. 28, 2007

(54) DIRECT CONTROL OF AN INDUCTION MOTOR

(75) Inventor: Maurizio Iotti, Povlgllo (IT)

(73) Assignee: Zapi S.p.A., Reggio Emilia (IT)

( * ) Notice: Subject to any disclaimer, the term of this patent is extended or adjusted under 35 U.S.C. 154(b) by 0 days.

(21) Appl. No.: 11/058,843

(22) Filed: Feb. 15, 2005

(65) Prior Publication Data

US 2005/0189902 A1    Sep. 1, 2005

(30) Foreign Application Priority Data

Feb. 16, 2004  (IT) .......................... PR2004A0009

(51) Int. Cl.
*H02K 13/00* (2006.01)
*H02P 1/40* (2006.01)

(52) U.S. Cl. ...................... 318/747; 318/138; 318/254; 318/439

(58) Field of Classification Search ................ 318/138, 318/139, 245, 254, 439, 721, 724, 801, 807, 318/775, 799, 471, 701, 459; 361/27; 310/68 B; 323/208
See application file for complete search history.

(56) References Cited

U.S. PATENT DOCUMENTS

| | | | | |
|---|---|---|---|---|
| 3,935,519 A * | 1/1976 | Pfarrer et al. | ................ | 388/838 |
| 4,011,489 A * | 3/1977 | Franz et al. | ................. | 318/798 |
| 4,023,083 A * | 5/1977 | Plunkett | ....................... | 318/802 |
| 4,041,361 A * | 8/1977 | Cornell | ....................... | 318/802 |
| 4,041,542 A * | 8/1977 | Pfarrer et al. | ................. | 361/27 |
| 4,044,284 A * | 8/1977 | Plunkett et al. | ............. | 318/803 |
| 4,280,085 A * | 7/1981 | Cutler et al. | ................ | 318/803 |
| 4,551,708 A * | 11/1985 | Welburn | ...................... | 341/116 |
| 4,568,865 A * | 2/1986 | Welburn | ...................... | 318/661 |
| 4,794,511 A * | 12/1988 | Lundin | ....................... | 363/156 |
| 4,823,067 A * | 4/1989 | Weber | ....................... | 318/799 |
| 5,180,960 A * | 1/1993 | Austermann | ................ | 318/701 |
| 5,216,343 A * | 6/1993 | Genheimer et al. | .... | 318/568.18 |
| 5,280,222 A * | 1/1994 | von der Heide et al. | ... | 318/138 |
| 5,313,151 A * | 5/1994 | Ogden et al. | ............... | 318/805 |
| 5,329,195 A * | 7/1994 | Horber et al. | ........... | 310/68 B |
| 5,434,496 A * | 7/1995 | Roberts | ...................... | 323/208 |
| 5,541,488 A * | 7/1996 | Bansal et al. | ............... | 318/801 |
| 5,708,337 A * | 1/1998 | Breit et al. | ................. | 318/439 |
| 6,222,331 B1 * | 4/2001 | Blum | ......................... | 318/254 |
| 6,703,805 B2 * | 3/2004 | Griffitts | ...................... | 318/459 |
| 2003/0193306 A1 * | 10/2003 | Griffitts | ...................... | 318/459 |
| 2006/0006748 A1 * | 1/2006 | Nilson | ....................... | 310/68 B |

* cited by examiner

*Primary Examiner*—Paul Ip
(74) *Attorney, Agent, or Firm*—IP Strategies

(57) ABSTRACT

This invention relates to sensorless control (i.e. without encoder at the motor shaft) of an induction motor (AC asynchronous motor). In particular, the invention comprises a method for a direct measurement of the electromotive forces (EMF) at the stator of the motor to allow for the regulation of the speed of the motor in a wide range, including the very low frequency range. The method provides the accurate measurement of the EMF at the stator in such a way that the direct control of an induction motor will get simpler, in terms of less calculation and, overall, in terms of accuracy and consistency of the results, thanks to the availability of a direct measurement of the EMF instead of a bare estimation thereof. To enable the direct measurement, the employment of at least two sensor windings (sensor coils) is needed each one mutually coupled with the stator phase of the motor.

6 Claims, 5 Drawing Sheets

*FIG. 1    (PRIOR ART)*

DIRECT CONTROL OF AN INDUCTION MOTOR

FIELD OF THE INVENTION

The present invention deals with a method for the direct control of an induction motor and an induction motor controlled by this control.

BACKGROUND OF THE INVENTION

The prior art deals with several sensorless control algorithms all of which are based on the knowledge of voltages and currents of the motor phases (direct torque control or direct field oriented control). By measuring the voltages and currents of the motor phases and by knowing the mathematical model of the motor, it is possible, with an integral calculus operation, to determine estimates for the stator flux components (see Formula 4,5,6 and 7) and the rotor flux components.

By a real time calculation of the magnitude and of the spatial orientation of said flux components, it is possible to apply the principles of the field oriented control. Moreover, simplified algorithms are well-known (sometimes called quasistatic), having less temporal variability than the field oriented control (e.g. constant V/f and slip control) that use the magnitude of the flux components only to apply a coarse speed regulation of an induction motor.

All of these methods (direct field oriented control and quasistatic) have a big drawback: the accuracy of the estimation of the flux components is very poor at low frequencies.

The reason is simple: for a fixed flux magnitude, the stator EMF is proportional to the applied frequency whereas the current in the motor does not depend on the frequency but only on the load torque. Therefore, drops of the stray parameters of the motor (stator resistances but also leakage inductances) are proportional to the current resulting in a strong influence when compared with the stator EMF at low frequencies; as the frequency increases this influence becomes more and more negligible.

In fact, the estimation of the stator flux is done by subtracting the drops of the stator resistances from the phase voltages and then integrating (see Formulas 6,7,4 and 5).

As above justified, it is at low frequency that the estimation of the flux components may be inadequate, because of the poor accuracy due to the error between the actual stator resistance and the one used in the calculation.

It is evident that the stator resistance used in the calculation has an intrinsic error: it is just enough to think at the thermal drift of the actual stator resistance, at the differences between the stator resistance of two phases, or at the drift and differences in the contact resistance of the motor and inverter connections.

The consequence is that the performance at low frequencies, at best, will be degraded but sometimes it can be totally compromised due to the error in the stator resistance estimation.

In the above considerations the drops in the leakage inductances have been deliberately ignored. We did that because these drops are not involved in the calculation of the motion torque. It will be shown next that the highlight of a control, without the encoder, is the accurate determination of the motion torque. We will see also that the torque determination makes use of the stator flux and motor current components.

To engross the above explanation it is necessary to refer to the following Formula 3 that is the general expression of the motion torque in an induction motor. The flux and current components in this formula are referred to according to an equivalent two phase model of the three phase motor. It is well known that it is possible to switch from the three phase model to the two phase model with the application of the Clarke transformations (Formula 1 and 2) below.

$$\begin{bmatrix} \varphi qs \\ \varphi ds \end{bmatrix} = D \cdot \begin{bmatrix} \varphi as \\ \varphi bs \end{bmatrix} \text{ with } D = \begin{bmatrix} \frac{1}{\sqrt{3}} & \frac{2}{\sqrt{3}} \\ 1 & 0 \end{bmatrix} \quad \text{Formula 1}$$

and vice versa $$\begin{bmatrix} \varphi as \\ \varphi bs \end{bmatrix} = D^{-1} \begin{bmatrix} \varphi qs \\ \varphi ds \end{bmatrix} \text{ with } D^{-1} = \begin{bmatrix} 0 & 1 \\ \frac{\sqrt{3}}{2} & -\frac{1}{2} \end{bmatrix} \quad \text{Formula 2}$$

$$Tm = \frac{3}{2} p(iqs \varphi ds - ids \varphi qs) \quad \text{Formual 3}$$

With:
Tm: motion torque.
$\varphi qs, \varphi ds$: stator flux components in the two phases equivalent model.
$\varphi as, \varphi bs$: stator flux components in the the a and b phases of the three phase model.
iqs,ids: stator current components in the equivalent two phase model. They are obtained from the application of the Clarke transformation for the ias, ibs pair of the original three phase motor.
p: poles pair number Formula 3 states that, by knowing the stator flux and current components it is possible to perform the real time calculation of the motion torque in magnitude and sign: the sign informs whether the torque is in the direction of the applied frequency or in the opposite one.

This is all we need to get a continuous monitoring of the state of the motor control. By knowing an accurate estimation of the motion torque and its direction, it is possible to decide without ambiguity whether the control works consistently with the state of the command or not. The well known low level control algorithm, consisting of a distinct modulation of the current component giving the torque and of the current component giving the flux, is a secondary point with respect to the possibility to apply a continuous supervision of the control.

In fact, we expect that, when the magnitude of the current in the motor is high, the torque must be high too and we expect its sign to be positive (motoring torque) when the actual frequency is lower than the commanded frequency; we expect the sign of the torque to be negative (braking torque) when the actual frequency is higher than the commanded frequency. Obviously, this holds for the case that the control tries correctly to reach the commanded frequency. Then, it can happen that the control is not able to reach the commanded frequency because of too much torque required (e.g. the vehicle is on a high grade with a load).

In this case, we expect that the controller works at the maximum allowed current with the maximum magnetic flux with the maximum torque magnitude and the proper torque sign being positive when the actual frequency is lower than the commanded frequency, and being negative when the actual frequency is higher than the commanded frequency.

But, above all, this continuous monitoring of the magnitude and sign of the motion torque allows to recognize when the working point is falling in the unwanted unstable area of the motor characteristic (too high slip and torque collapsed area): in fact this condition is represented by a huge current in the motor together with a very low supplied motion torque magnitude. If we are able to detect when the working point lies in the unwanted unstable area, it is quite sure we can avoid to fall in that trap.

So, the accurate measurement of the actual motion torque represents the highlight of the control, because it becomes possible to recognize when the working point of the motor is not consistent with the command or when the working point falls in the unstable area of the motor characteristic allowing to apply a real time countermeasure or a corrective action. These countermeasures will operate on the well known low level control algorithm and consist of a proper modulation of the flux, of the armature current and of the frequency, in order to control the motor again properly.

The above is supplied to make evident the high importance of a correct torque estimation. Besides, for a correct modulation of the flux in the low level algorithm, the high importance of a correct flux estimation is also obvious. The conclusion is that the control without the encoder at the motor shaft, may work properly, if the calculation of the Formula 3 (and also the flux estimation) gives accurate results.

It is one goal of the present invention to provide a measurement of the magnetic flux components instead of a bare estimate: then the torque and flux calculations will have the suited level of accuracy for a consistent applying of the Formula 3 and for an accurate flux measurement. This goal, together with other ones, are reached by the method for a direct measurement of the electromotive forces in an induction motor (to be used in a direct control of the motor self), and by the motor that makes possible this direct measurement. Method and motor are characterized as explained in the annexed claims.

BRIEF DESCRIPTION OF THE DRAWINGS

Characteristics and advantages of the invention will be better explained in the following description of some arrangements, illustrated, as indication only, and also by the accompanying Figures.

FIG. 2 refers to a delta wound motor in which sensor coils are made explicit.

FIG. 3 refers to a star wound motor in which sensor coils are made explicit.

DETAILED DESCRIPTION OF THE INVENTION

The calculation of the stator flux components ($\varphi qs$, $\varphi ds$) may be executed by integrating the components of the electromotive forces in a two phase equivalent model (eqs and eds) at the stator phases (Formulas 4 and 5).

$$\varphi qs = \int_0^t eqs\, dt + \varphi qs0 \qquad \text{Formula 4}$$

$$\varphi ds = \int_0^t eds\, dt + \varphi ds0 \qquad \text{Formula 5}$$

The indeterminacy element given by the initial conditions on the flux ($\varphi qs0$, $\varphi ds0$), represents the well known problem of unobservable flux at null frequency. This is a further drawback, not totally solved, of the direct control algorithm. The problem can be by-passed by assuming that the frequency is never null; in other words, when the frequency is different from zero, the flux initial components ($\varphi qs0$, $\varphi ds0$) generate a transient response decaying after a short delay. Neglecting this transient, we can assume these initial flux components to be null.

By implementing the Formula 4 and 5 in the control code, the real time determination of the stator flux components is made possible. Then, by measuring also the stator currents with proper current sensors, all the quantities in Formula 3 are known that are necessary to calculate the motion torque. For a good accuracy in torque calculation, it is necessary to have an accurate knowledge of the stator electromotive forces. To obtain this accurate knowledge, sensor coils, also refereed to as sense coils, are provided for the motor to make it possible to directly measure such electromotive forces.

Figure 1:
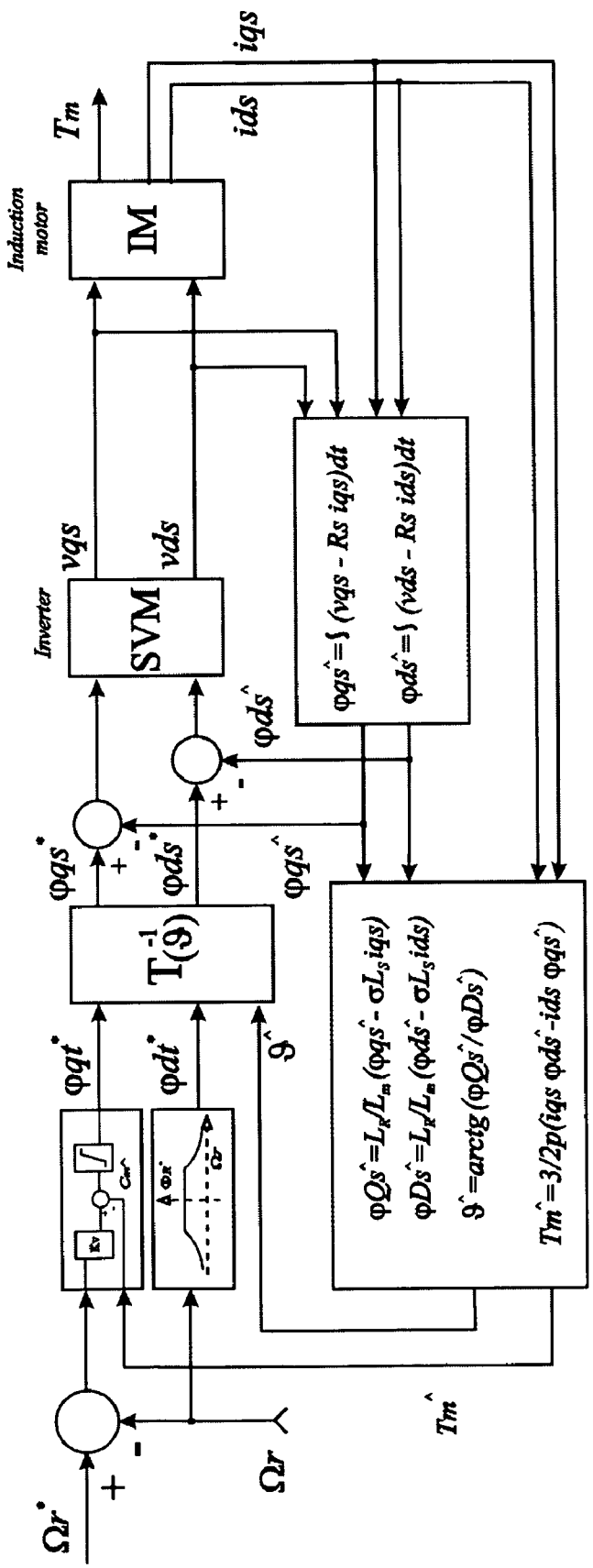
FIG. 1 illustrates a model of a direct field oriented control, following the prior art, in which the estimation of the electromotive forces and the integration of them to obtain the stator flux components are made explicit.
Figure 2:
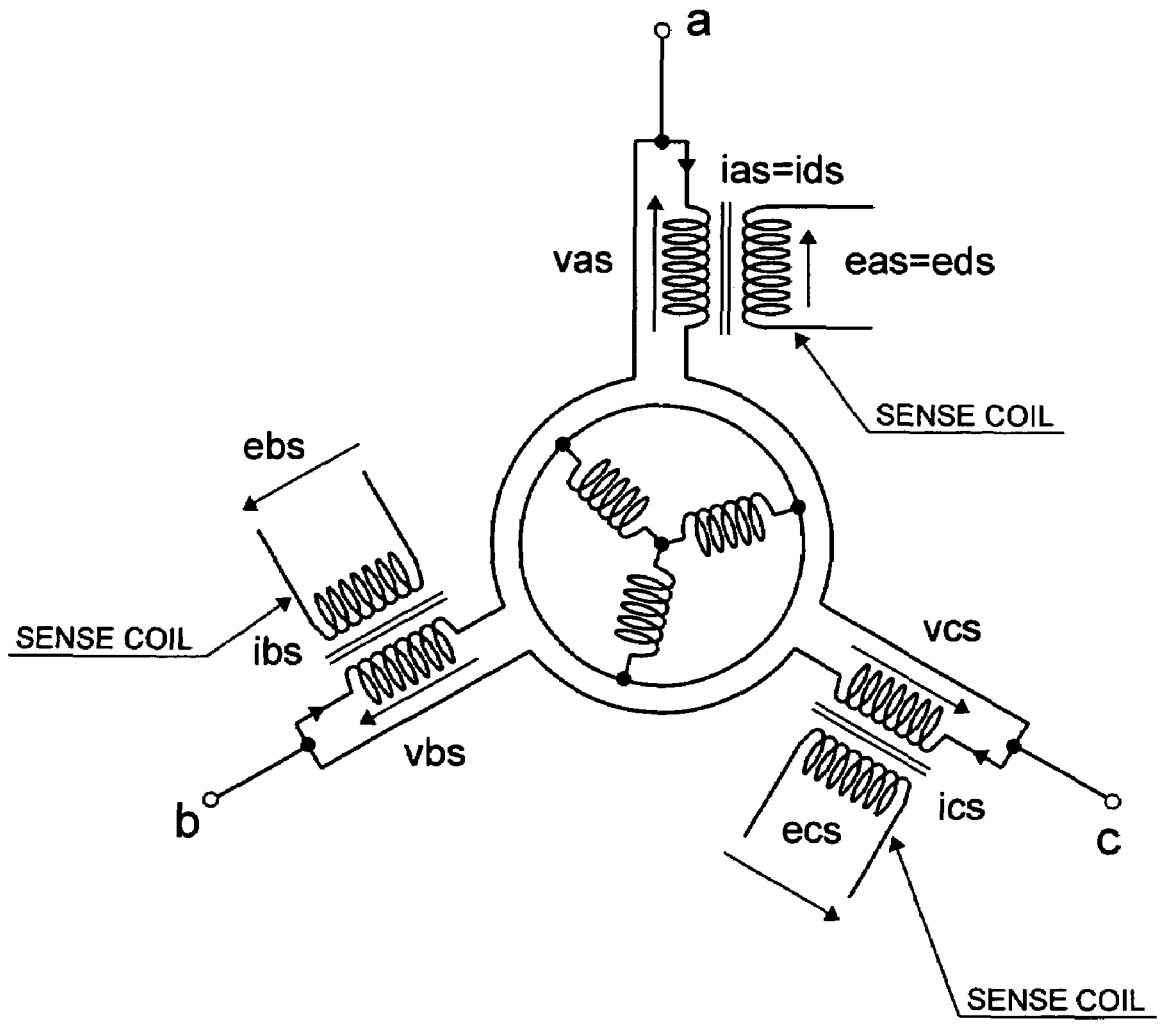
FIG. 2 illustrates the electrical model of the motor after the modification of the winding providing direct measurement of the electromotive forces. This modification consists in auxiliary windings (sensor coils).
Figure 3:
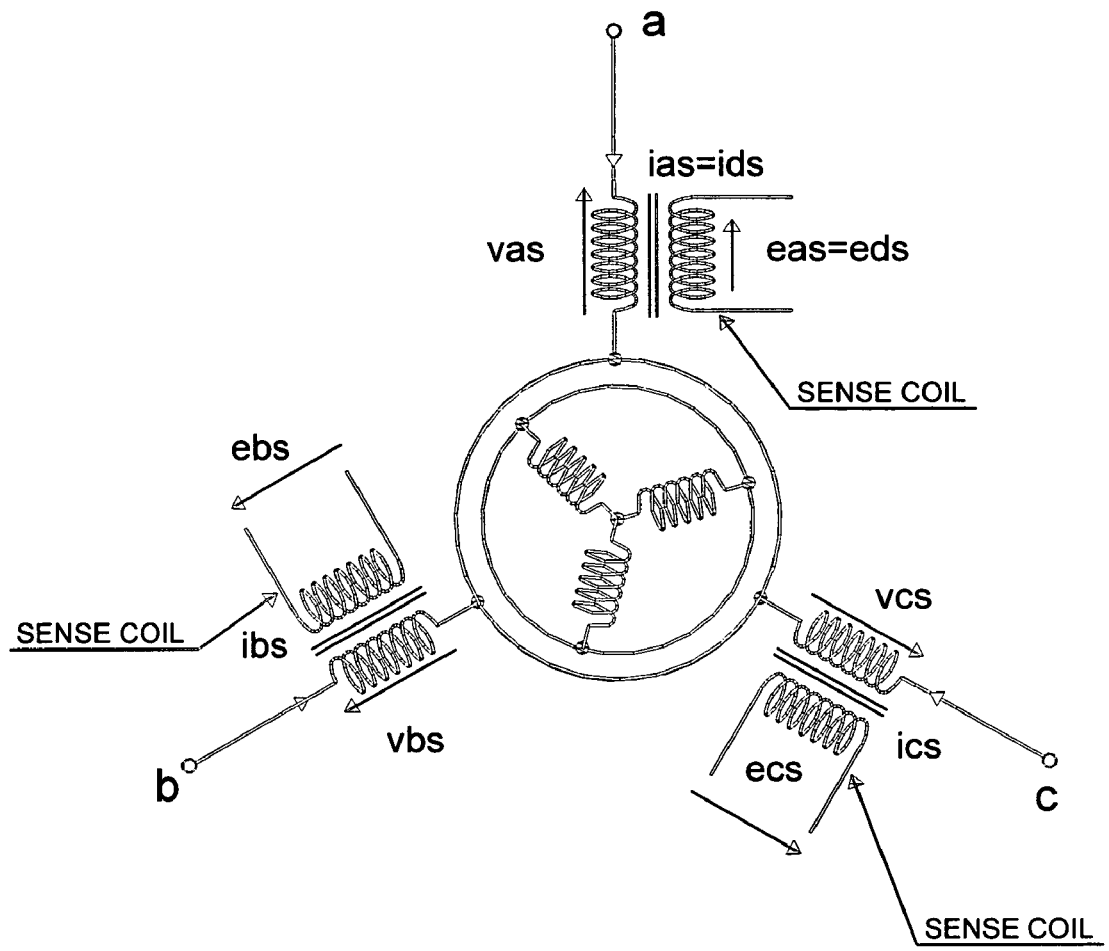
FIG. 3 illustrates the electrical model of the motor after the modification of the winding providing the direct measurement of the electromotive forces. This modification consists in auxiliary windings (sensor coils).

Such auxiliary windings (sensor coils) will be made in a mutual linking with the phase windings and it is preferred (but not needed) that they have the same number of turns (FIGS. 2 and 3). To obtain a closer mutual link and to simplify the production, such auxiliary windings may consist of a single enamelled copper conductor (for every phase) of a very thin section that will be added to the group of conductors that constitute the motor phase section and wound together for the whole phase turns. At the end of this proceeding every auxiliary winding will have the same number of turns of the mutually linked stator phase but, its terminals must be kept distinct from the phase terminals.

Every sensor coil can be wound separately, but still mutually coupled with the stator phase winding and can, in principle, have either the same or a different number of turns of the coupled stator phase.

Figure 4:
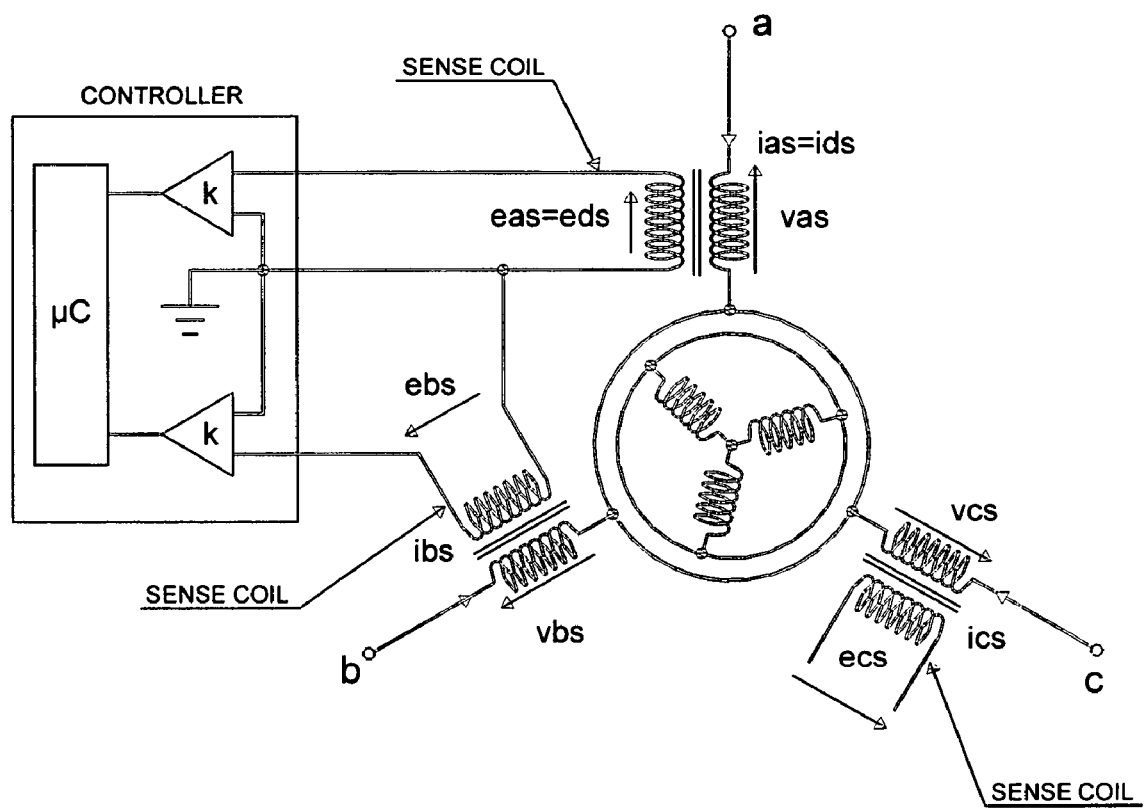
FIG. 4 illustrates an example for the connection of the sensor coils with the inverter operating the motor control.

There must be provided at least two of such auxiliary windings (sensor coils) each of which is coupled with a particular motor phase. However, also three auxiliary windings for the three motor phases may be used. Then, the two (or three) auxiliary windings may be connected, as shown in FIG. 4, in order to minimize the number of connections with the inverter (i.e. three connection points).

Due to the mutual coupling between the sensor coils and stator phases, the linked voltage output from the sensor coils will correspond perfectly to the electromotive force of the phase to which it is coupled.

Having at least two sensor coils, one can determine the electromotive force in two stator phases; we know the third is linear dependent from the first two (it is the sum with the opposite sign of the first two). By applying the Clarke transformation it is possible to obtain the components of the electromotive forces in a two phases equivalent model (eqs and eds). By applying Formula 4 and 5 to such electromotive forces, we obtain the stator flux components and also the motion torque value following the calculation according to Formula 3.

As stated in the prior art, the alternative to the direct measurement is the estimation of the electromotive forces using the Formulas 6 and 7 below. Said estimation is obviously inaccurate because of the presence of a motor parameter (stator resistance Rs) that is hard to be known for the reasons mentioned above.

$$eqs = vqs - Rs\ iqs \quad \text{Formula 6}$$

$$eds = vds - Rs\ ids \quad \text{Formula 7}$$

The solution of directly measuring the electromotive forces, represents an innovation, in terms of higher reliability and cost reduction when compared with the adoption of an encoder. In fact, the encoder has two evident drawbacks:

a) It is expensive: the motor modification by implementing the sensor coils is clearly cheaper than the adoption of the encoder in the motor shaft.

b) It has a poor reliability: it is well known that the mechanical connection between a robust and roughness induction motor able to work at high temperatures (up to 150 degrees) and a delicate mechanic sensor (as the Encoder is) with a wide electromagnetic susceptibility (made worse by the presence of electromagnetic fields in the motor) shows disappointing levels of reliability in practical applications, giving rise for an urgent demand for the research of alternative means.

It is obvious that the solutions with the encoder and the one with the sense coils are not equivalent: on certain applications in which the fine adjustment of the speed is required, the encoder is mandatory; but wherever a coarse adjustment of the speed is enough, the present alternative is suitable.

For example, this is the case for the traction in battery powered electrical vehicles in which the driver closes the loop with the actual speed by modulating the accelerator position.

The suitability of the sensor coils is even more evident by considering that it is possible to use a sensor coil for the motor temperature measurement. In fact, most of the motors for industrial applications have thermal sensors integrated to shut the motor down in case of overheating.

Figure 5:
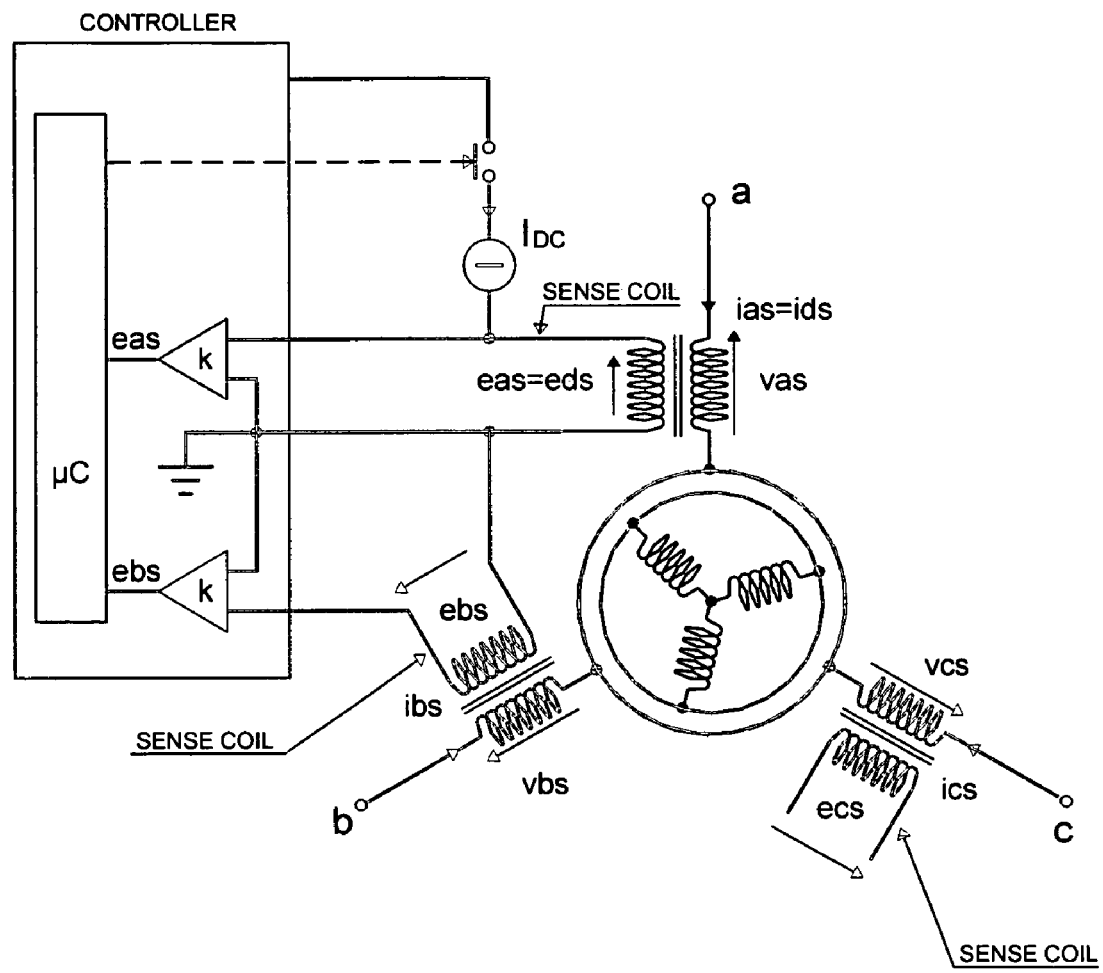
FIG. 5 illustrates the use of a sensor coil for the motor temperature measurement.

Such a function may be effectively executed through one of the herein employed sensor coils in conjunction with an elaborated unit that, in addition to the main function, i.e. to detect the electromotive forces, will execute also the secondary function of feeding a direct current of a well-known value in the sensor coil to enable the calculation of the sensor coil resistance being the ratio between the resulting medium voltage and the fed current (FIG. 5).

By knowing the resistance of the sensor coil at a certain temperature ($R_{Tref}$ at the temperature Tref), and the resistance of the sensor coil at the unknown temperature ($R_T$ at the temperature T) a real time calculation of the motor windings temperature (T) is possible by employing the Formula 9. Formula 9 is obtained by inverting the Formula 8 that gives the thermal drift of the copper resistance:

$$R_T = R_{Tref} \frac{231.41 + T}{231.41 + Tref} \quad \text{Formula 8}$$

$$T = (231.41 + Tref) \frac{R_T}{R_{Tref}} - 231.41 \quad \text{Formula 9}$$

The invention claimed is:

1. Method for a direct control, in particular, without an encoder, of an induction motor comprising a stator, comprising the steps of directly measuring the stator electromotive forces for at least two stator phases, transmitting the results of such measurements to a direct control system and calculating the flux of said stator electromotive forces with an integral calculus operation by means of the direct control system.

2. Three phases induction motor comprising at least two sensor coils to detect the electromotive forces for at least two particular motor phases, each of said sensor coils being mutually coupled with one of said two stator phases, and wherein the voltage output from each sensor coil corresponds to the electromotive force according to the phase to which it is mutually coupled.

3. Induction motor according to claim 2, further comprising a measuring unit connected to the sensor coils and configured to measure the temperature of the stator motor windings.

4. Induction motor according to claim 2, further comprising a third sensor coil, and wherein each of the sensor coils is coupled with one of the stator phases.

5. Induction motor according to claim 2, wherein every sensor coil is formed by a single enamelled copper conductor that will be added to a group of enamelled conductors that constitute the motor phase section and are wound together for the entire phase winding.

6. Induction motor according to claim 2, wherein every sensor coil is wound separately, but still mutually coupled with the stator phase winding and has either the same or a different number of turns as the coupled stator phase.

* * * * *